(12) United States Patent
Park

(10) Patent No.: US 11,579,927 B2
(45) Date of Patent: Feb. 14, 2023

(54) ELECTRONIC DEVICE FOR SECURING USABLE DYNAMIC MEMORY AND OPERATING METHOD THEREOF

(71) Applicant: Samsung Electronics Co., Ltd., Suwon-si (KR)

(72) Inventor: Jaehong Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 74 days.

(21) Appl. No.: 16/989,966

(22) Filed: Aug. 11, 2020

(65) Prior Publication Data

US 2021/0064434 A1 Mar. 4, 2021

(30) Foreign Application Priority Data

Aug. 30, 2019 (KR) ........................ 10-2019-0107647

(51) Int. Cl.
*G06F 9/50* (2006.01)
*G06F 15/02* (2006.01)
*G06F 11/30* (2006.01)
*G06F 11/34* (2006.01)
*G06F 9/48* (2006.01)

(52) U.S. Cl.
CPC .......... *G06F 9/5016* (2013.01); *G06F 9/5022* (2013.01); *G06F 11/3037* (2013.01); *G06F 11/3075* (2013.01); *G06F 11/3089* (2013.01); *G06F 11/3409* (2013.01); *G06F 15/0208* (2013.01); *G06F 9/4862* (2013.01); *G06F 2201/81* (2013.01); *G06F 2209/508* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 6,199,173 B1 | 3/2001 | Johnson et al. | |
| 6,654,773 B2 | 11/2003 | Hills | |
| 7,444,482 B2 | 10/2008 | Huras et al. | |
| 7,552,364 B2 | 6/2009 | Johnson et al. | |
| 7,668,923 B2* | 2/2010 | Herring | H04L 12/00 709/209 |
| 9,141,510 B2 | 9/2015 | Hsia | |
| 11,357,071 B2* | 6/2022 | Da Silva | H04W 36/08 |
| 11,452,032 B2* | 9/2022 | Gupta | H04W 24/08 |
| 2002/0055969 A1* | 5/2002 | Sato | G06F 9/4416 709/203 |
| 2003/0074601 A1 | 4/2003 | Schultz et al. | |

(Continued)

FOREIGN PATENT DOCUMENTS

KR 10-2008-0075293 A 8/2008
KR 10-1669762 B1 10/2016

*Primary Examiner* — Abu Zar Ghaffari
(74) *Attorney, Agent, or Firm* — Harness, Dickey & Pierce, P.L.C.

(57) ABSTRACT

An electronic device including an application processor and a communication processor. The communication processor including a resource memory, the communication processor configured to monitor an occupancy rate of the resource memory, determine whether the electronic device is in an idle state, forcibly release a network connection, clear the resource memory, and reconnect the network connection.

18 Claims, 7 Drawing Sheets

(56) References Cited

U.S. PATENT DOCUMENTS

| | | | |
|---|---|---|---|
| 2006/0209695 A1* | 9/2006 | Archer | G06F 9/505 |
| | | | 370/235 |
| 2010/0085871 A1* | 4/2010 | Barsness | G06F 11/3404 |
| | | | 370/221 |
| 2013/0042251 A1* | 2/2013 | Nader | G06F 9/4881 |
| | | | 718/103 |
| 2014/0181998 A1* | 6/2014 | Hunt | H04W 12/08 |
| | | | 726/30 |
| 2015/0106637 A1* | 4/2015 | Zhang | H04W 52/027 |
| | | | 713/320 |
| 2015/0262067 A1* | 9/2015 | Sridhara | H04L 63/14 |
| | | | 706/12 |
| 2016/0241767 A1* | 8/2016 | Cho | G06F 3/0346 |
| 2017/0102968 A1 | 4/2017 | Pont | |
| 2017/0223597 A1* | 8/2017 | Telang | H04W 36/24 |
| 2019/0179747 A1* | 6/2019 | Kim | G06F 12/0253 |
| 2019/0196867 A1* | 6/2019 | Plondke | G06F 9/4812 |
| 2020/0120592 A1* | 4/2020 | Geng | H04W 76/19 |
| 2020/0379810 A1* | 12/2020 | Dalmia | G06F 9/5038 |
| 2022/0086104 A1* | 3/2022 | Miller | H04L 47/821 |

* cited by examiner

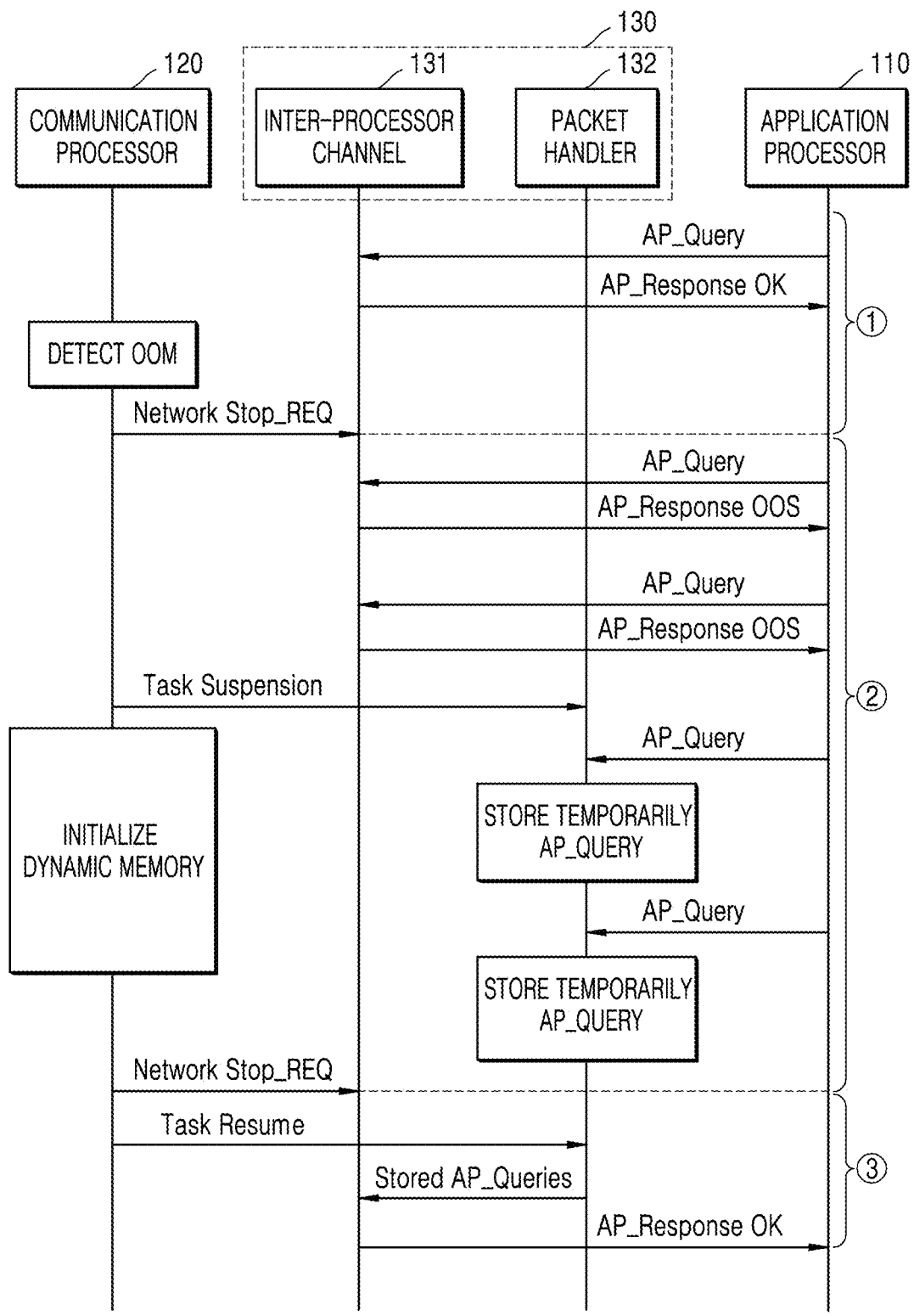

① SECTION

② SECTION

③ SECTION

ELECTRONIC DEVICE FOR SECURING USABLE DYNAMIC MEMORY AND OPERATING METHOD THEREOF

CROSS-REFERENCE TO RELATED APPLICATION

This application claims the benefit of Korean Patent Application No. 10-2019-0107647, filed on Aug. 30, 2019, in the Korean Intellectual Property Office, the disclosure of which is incorporated herein in its entirety by reference.

BACKGROUND

The inventive concepts relate to an electronic device, and more particularly, to an electronic device securing usable dynamic memory based on an occupation rate of a dynamic memory and an idle state of the electronic device, and/or an operating method of the electronic device.

In a wireless communication system, an electronic device may include a plurality of cores in one chip, and a core may correspond to an application processor (AP) for driving various application programs or a communication processor (CP) for performing wireless communication.

In the case of the AP, a resource memory allocated for running various applications is large, while the CP has a relatively smaller size of allocated resource memory. In addition, in the case of the AP, when a large amount of allocated resources is used, insufficient resource memory may be secured in a garbage collection process. In contrast, in the case of the CP, since resources are limited, there is no process such as the garbage collection process for reserving memory. In the CP, memory leakage may be killed to secure limited resource memory. However, considering the characteristics of the CP in which dynamic memory allocation frequently occurs for smooth wireless communication, since a process of allocating resource memory for determining the memory leakage is also a resource consumption, operating a process for determining the memory leakage with a limited resource may result in allocating available resources, and thus, may reduce an overall system performance.

SUMMARY

The inventive concepts provides an electronic device capable of preventing an out of memory (OOM) by releasing a network connection and clearing a dynamic memory based on an occupation rate of the dynamic memory and an idle state of the electronic device, and an operating method of the electronic device.

According to an aspect of the inventive concepts, there is provided an electronic device including an application processor; and a communication processor including a resource memory, the communication processor configured to monitor an occupancy rate of the resource memory, determine whether the electronic device is in an idle state, forcibly release a network connection, clear the resource memory, and reconnect the network connection.

According to another aspect of the inventive concepts, there is provided an operating method of an electronic device including monitoring an occupancy rate of a resource memory in a communication processor; determining whether the electronic device is in an idle state; and releasing forcibly a network connection, clearing the resource memory, and reconnect the network connection.

According to another aspect of the inventive concepts, there is provided an operating method of a communication processor including monitoring an occupancy rate of a resource memory of the communication processor; detecting whether the occupancy rate exceeds a threshold value during a threshold time period; determining whether an electronic device including the communication process is in an idle state; when the electronic device is in the idle state in response to the detecting that the occupancy rate of the resource memory exceeds the threshold value; releasing a wireless network connection in an identical manner to a flight mode when the electronic device is in the idle state; releasing configuration information related to the wireless network connection; and releasing a dynamic memory area in response to receiving a signal from a task having a lowest priority.

BRIEF DESCRIPTION OF THE DRAWINGS

Embodiments of the inventive concepts will be more clearly understood from the following detailed description taken in conjunction with the accompanying drawings in which:

FIG. 6A is a signal exchange diagram between an application processor and a communication processor, according to an example embodiment of the inventive concepts.

DETAILED DESCRIPTION OF THE EMBODIMENTS

Figure 1:
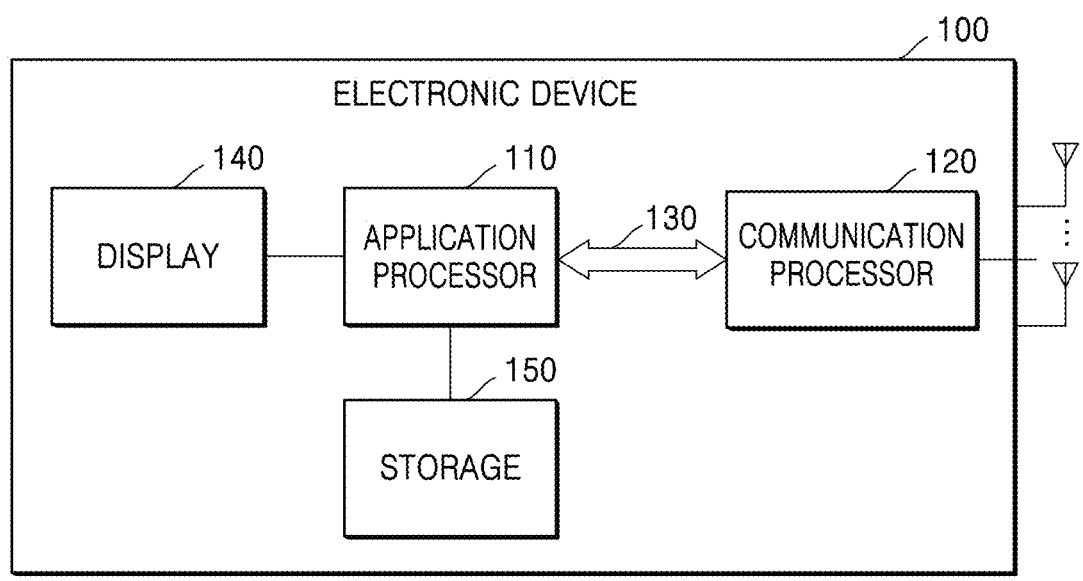
FIG. 1 is a block diagram illustrating an electronic device according to an example embodiment of the inventive concepts.

FIG. 1 is a block diagram illustrating an electronic device 100 according to an example embodiment of the inventive concepts.

Referring to FIG. 1, the electronic device 100 is disclosed. The electronic device 100 may include a device used by a user and may communicate with an external device (for example, a base station or another electronic device) via a wireless channel. In addition to a terminal, the term "electronic device 100" may be replaced by terms such as user equipment (UE), a mobile station, a subscriber station, customer premises equipment (CPE), a remote terminal, a wireless terminal, a user device, or other terms having equivalent technical meanings.

According to various embodiments, the electronic device 100 may include an application processor 110, a communication processor 120, an interface 130, a display 140, and a storage 150.

The application processor 110 may control overall operations of the electronic device 100. For example, the application processor 110 may write data to and read data from the storage 150. To this end, the application processor 110 may include at least one processor or a microprocessor, or may be a portion of a processor.

The communication processor 120 may perform functions of transmitting and receiving signals via a wireless channel. For example, the communication processor 120 may perform a conversion function between a baseband signal and a bit string according to a physical layer standard of a system. For example, during data transmission, a communication unit may generate complex symbols by encoding and modulating a transmission bit string, and during data reception, may restore a received bit string by demodulating and decoding the baseband signal. In addition, the communication processor 120 may up-convert a baseband signal to a radio frequency (RF) band signal, or may down-convert an RF band signal received via the antenna to a baseband signal. The interface 130 may perform signaling between the application processor 110 and the communication processor 120.

The application processor 110 and the communication processor 120 may be hardware including logic circuits; a hardware/software combination such as a processor executing software; or a combination thereof. For example, the application processor 110 and the communication processor 120 more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The display 140 may visually provide information to the outside (for example, to a user) of the electronic device 100. For example, the display 140 may display an indicator area on the top of a screen. The indicator area may display an antenna-shaped icon for indicating a communication state of the electronic device 100.

The storage 150 may store data such as a basic program, an application program, and setting information for the operation of the electronic device 100. The storage 150 may include a volatile memory, a nonvolatile memory, or a combination thereof. The storage 150 may provide stored data according to a request from the application processor 110.

Figure 2:
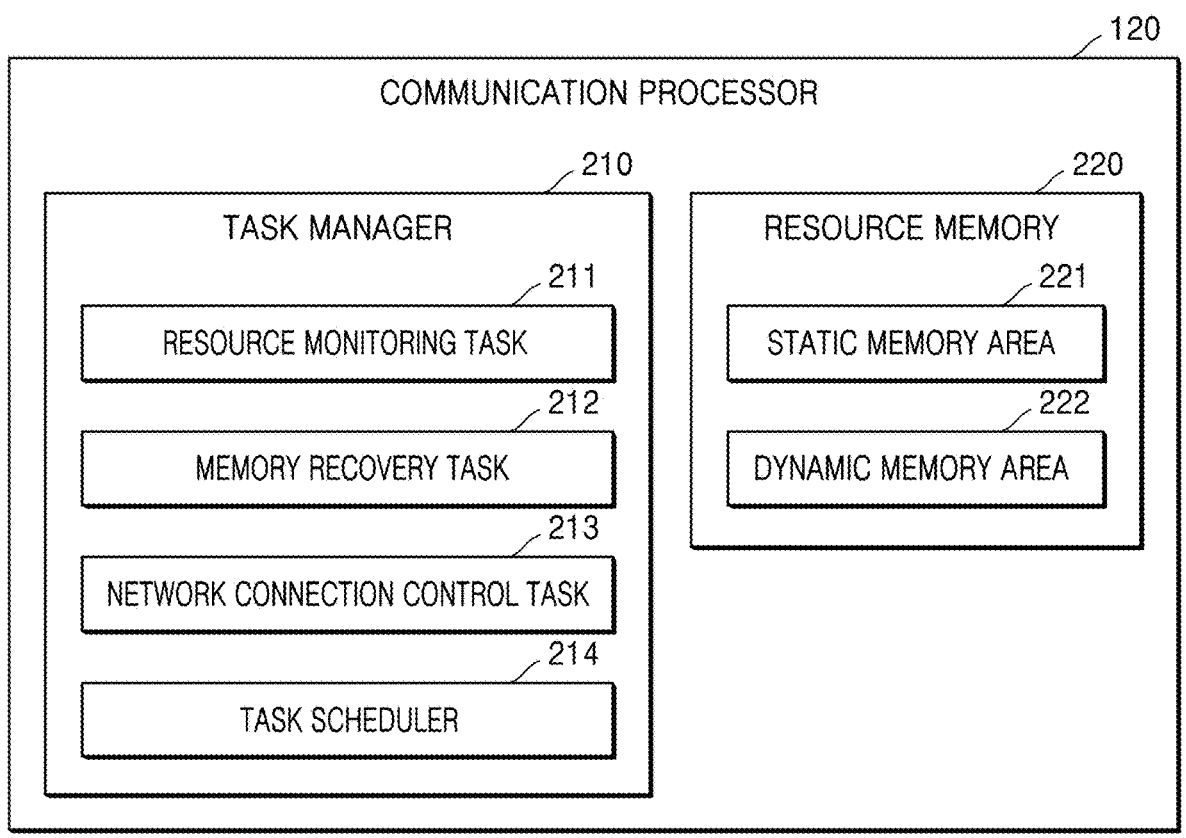
FIG. 2 is a block diagram illustrating a communication processor according to an example embodiment of the inventive concepts.

FIG. 2 is a block diagram illustrating a communication processor according to an example embodiment of the inventive concepts.

Referring to FIG. 2, the communication processor 120 may include a task manager 210 and a resource memory 220.

According to various embodiments, the task manager 210 may execute or perform a plurality of tasks. For example, the task manager 210 may perform a resource monitoring task 211, a memory recovery task 212, a network connection control task 213, and a task scheduler 214 and may perform each task. The task manager 210 may be, for example, a portion of the processor executing instructions and thus configured as the task manager 210.

The resource monitoring task 211 may monitor an occupancy rate of the resource memory 220. For example, when the occupancy rate of the resource memory 220 exceeds a certain value, the memory recovery task 212 may be triggered and initialize a dynamic memory area.

The memory recovery task 212 may reduce the occupancy rate of the resource memory 220 by initializing the dynamic memory area, and may solve memory leakage. For example, the memory recovery task 212 may release all databases of network configuration information stored in the dynamic memory area by instructing the network connection control task 213 to release the wireless network connection collectively. As another example, the memory recovery task 212 may determine whether an agreement is received from a task having the lowest priority for preventing a memory error of a duplicate release prior to the dynamic memory area initialization.

The network connection control task 213 may activate or deactivate the wireless network connection of the electronic device 100. For example, by controlling a physical layer, a link layer, and a network layer, the wireless network connection may be collectively released. In addition, the task scheduler 214 may schedule the plurality of tasks according to priority. For example, when a first task and a second task are scheduled, and the priority of the first task is higher than the second task, the task scheduler 214 may schedule the first task to be performed first.

According to various embodiments, the resource memory 220 may be divided into a static memory area 221 and a dynamic memory area 222. The static memory area 221 may be an area exclusively occupied by a particular layer. The static memory area 221 may be maintained until the electronic device 100 reboots or powers off. The dynamic memory area 222 may be an area in which memories are dynamically allocated and de-allocated for sharing limited resources by various layers.

Figure 3:
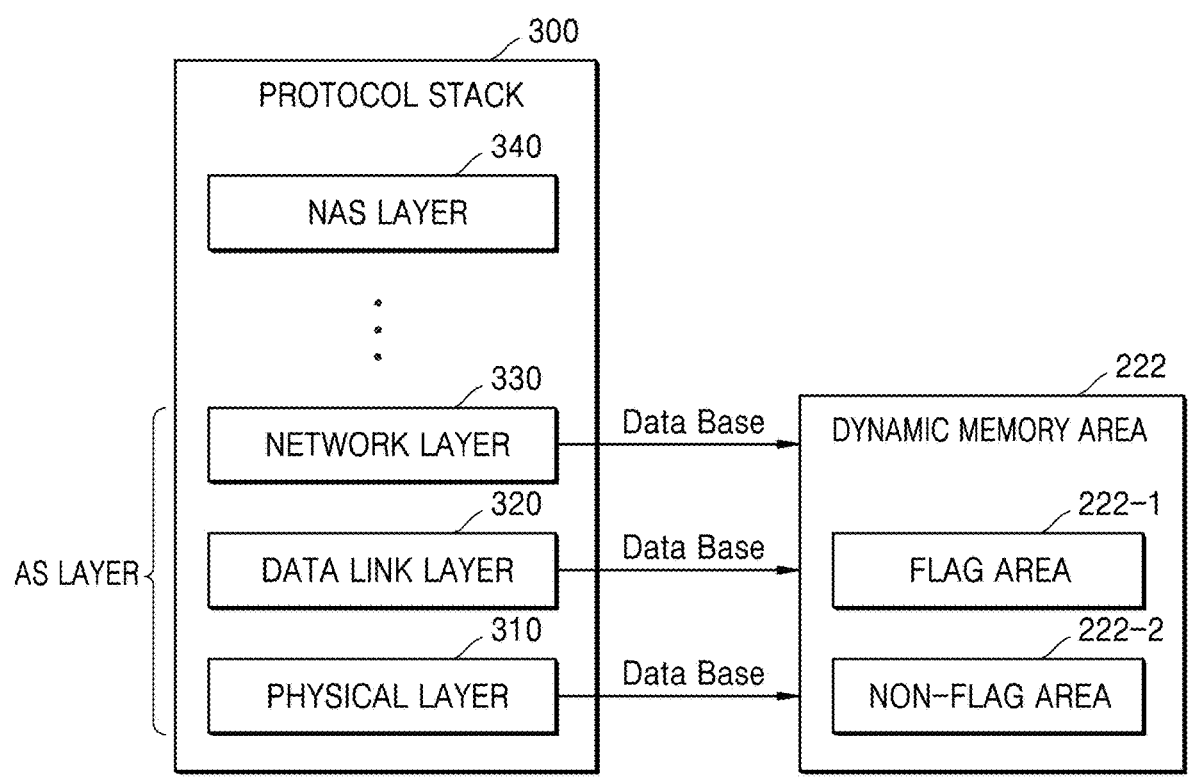
FIG. 3 is a block diagram of a protocol stack and a dynamic memory area corresponding thereto, according to an example embodiment of the inventive concepts.

FIG. 3 is a block diagram of a protocol stack 300 and the dynamic memory area 222 corresponding thereto, according to an example embodiment of the inventive concepts.

Referring to FIG. 3, the protocol stack 300 may support any radio access technology (RAT) and may include a plurality of layers. The protocol stack 300 may include a physical layer 310, a data link layer 320, and a network layer 330, which correspond to three lower layers of an open system interconnection (OSI) model, respectively. For example, the data link layer 320 may include a medium access control (MAC) layer, a radio link control (RLC) layer, and a packet data convergence protocol (PDCP) layer. The network layer 330 may include a radio resource control (RRC) layer. The physical layer 310, data link layer 320, and network layer 330 may comprise an access stratum (AS) layer, in contrast to a non-access stratum (NAS) layer 340.

The access stratum (AS) layer may store a database in the dynamic memory area 222. The database may be referred to as a valid unit of information to be maintained for a task performed by each layer. For example, the database that the network layer 330 stores in the dynamic memory area 222 may include information about currently open radio bearers.

According to various embodiments, the dynamic memory area 222 may include a flag area 222-1 and a non-flag area 222-2. The flag area 222-1 may store information to be maintained regardless of initialization of the dynamic memory area 222. For example, subscriber identity module (SIM) information, timer information, or location information may be stored in the flag area 222-1 by adding a flag. As to be described later, when the dynamic memory area 222 performs the initialization, the database stored in the flag area 222-1 may not be lost, and all of the memories allocated to the non-flag area 222-2 may be released.

Figure 4:
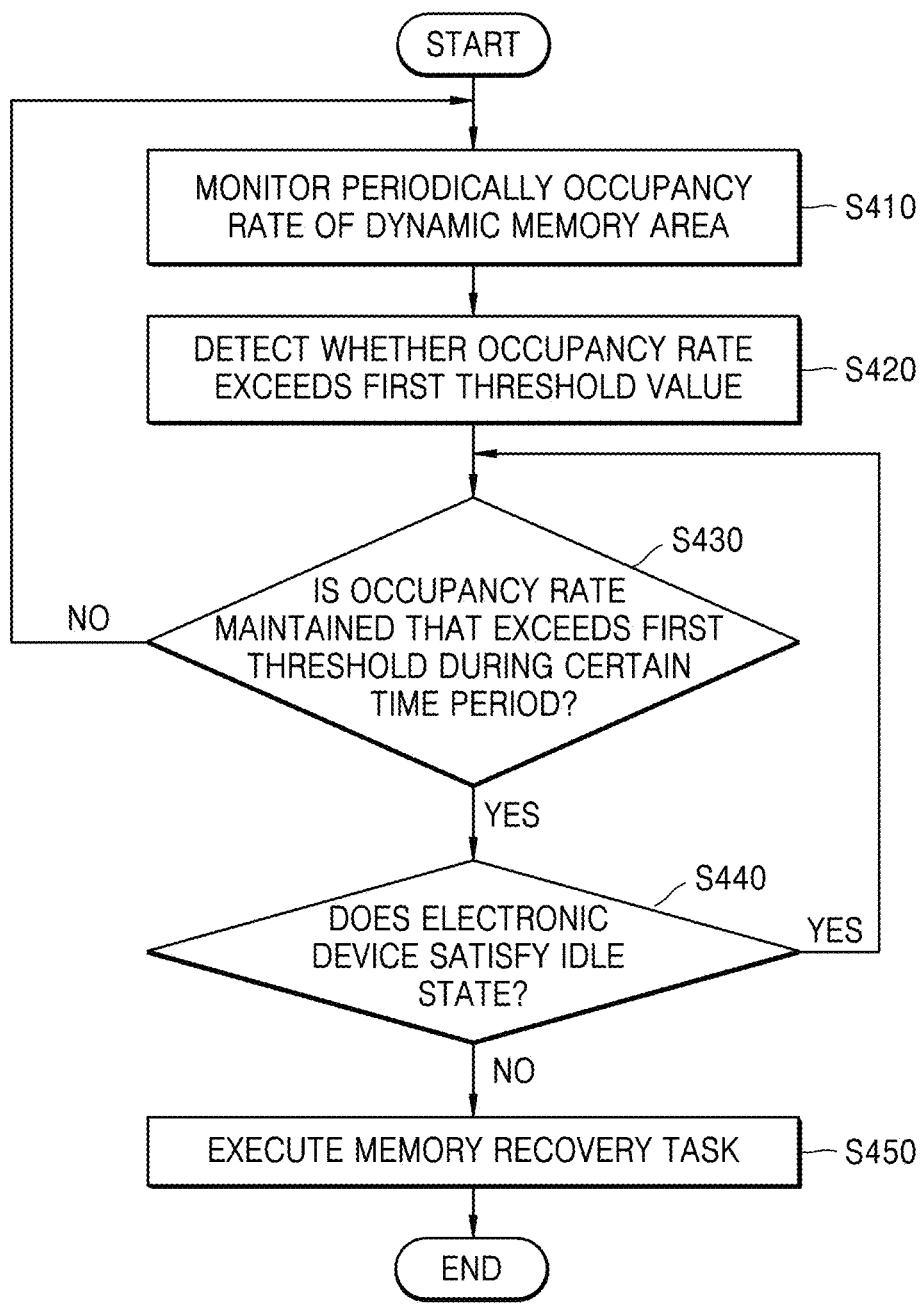
FIG. 4 is a block diagram illustrating an operation sequence of a communication processor, according to an example embodiment of the inventive concepts.

FIG. 4 is a block diagram illustrating an operation sequence of a communication processor, according to an example embodiment of the inventive concepts.

Referring to FIG. 4, in some embodiments, a method illustrated in FIG. 4 may be performed by the communication processor 120 in FIG. 1, or the task manager 210 in FIG. 2.

The communication processor 120 may periodically monitor an occupancy rate of the dynamic memory area 222

(S410). The communication processor 120 may execute the resource monitoring task 211 by using the task manager 210. For example, the resource monitoring task 211 may be scheduled once or twice per second, and the task priority thereof may be low. The communication processor 120 may periodically obtain information about the occupancy rate of the dynamic memory area 222 by comparing a size of the dynamic memory area 222 with a size of an area allocated by a memory allocation (malloc) function.

The communication processor 120 may detect whether the occupancy rate exceeds a first threshold value (S420). For example, the communication processor 120 may determine whether to execute the memory recovery task 212, when the occupancy rate of the obtained dynamic memory exceeds the preset first threshold value while periodically obtaining the occupancy rate of the dynamic memory. According to various embodiments, the first threshold value may be determined by experimental data or set by a user or a producer. According to an embodiment, the first threshold value may correspond to about 60%. However, when the dynamic memory area is temporarily occupied due to the occupancy rate exceeding the first threshold value, operation S430 may be performed.

The communication processor 120 may determine whether the occupancy rate exceeding the first threshold value is maintained for a certain period (S430). When a dynamic memory initialization is performed every time the occupancy rate of the dynamic memory exceeds the first threshold value, the dynamic memory initialization may be executed too frequently. In addition, in the case where the dynamic memory is initialized every time even when the occupancy rate of the dynamic memory exceeds the first threshold because a data processing bottleneck phenomenon occurs, not because the memory leakage is accumulated in the dynamic memory area 222, the wireless communication efficiency may be reduced, and inconvenience to users due to frequent disconnection may occur.

According to various embodiments, the certain period may be determined by experimental data or set by a user or a producer. According to an embodiment, the certain period may correspond to about 5 seconds.

According to an embodiment, when the occupancy rate of the dynamic memory exceeds the first threshold value for the certain time is maintained, it may be determined that the occupancy rate of the dynamic memory is increased because the memory leakage is accumulated rather than a temporary excess, and the communication processor 120 may perform operations for the dynamic memory initialization.

According to another embodiment, when the state of the dynamic memory occupancy exceeding the first threshold for the certain time is not maintained, for example, when the occupancy rate of the dynamic memory is again reduced to about 60% or less within about 5 seconds, it may be reasonable to conclude that the cause is a temporary increase in the occupancy rate rather than an increase in the occupancy rate due to the memory leakage. Accordingly, the communication processor 120 may perform operation S410 again and periodically monitor the occupancy rate of the dynamic memory.

The communication processor 120 may determine whether the electronic device 100 satisfies an idle state (S440). The idle state of the electronic device 100 may be a state in which the state of the network connection of the electronic device 100 is distinguished from the idle state of the electronic device 100 (e.g., an RRC idle state). For example, the idle state may be a state indicating whether the electronic device 100 is occupied or used by a user.

According to various embodiments, the communication processor 120 may determine the idle state of the electronic device 100, based on at least one condition with which it is possible to determine that the user is using the electronic device 100. For example, the at least one condition may be whether the communication processor 120 is on-call, an amount of usage of a central processing unit (CPU), and/or whether the electronic device 100 is operating.

According to an embodiment, the communication processor 120 may determine the idle state based on an on-call signal. As to be described later with reference to FIG. 5, when the dynamic memory initialization is performed according to an example embodiment of the inventive concepts, a connection with a network may be released and an unwanted call drop may occur. Accordingly, when the communication processor 120 is currently on-call, the communication processor 120 may bypass the dynamic memory initialization and perform operation S430. For example, the communication processor 120 may continuously monitor whether the first threshold value is exceeded.

According to another embodiment, the communication processor 120 may determine the idle state of the electronic device 100 based on the usage amount of the CPU. The CPU may correspond to the application processor 110 illustrated in FIG. 1. For example, the communication processor 120 may determine whether the usage amount of the CPU exceeds a second threshold value. The second threshold may be determined by experimental data and may be set by the user or the producer. The communication processor 120 may monitor the usage amount of the application processor 110. When the usage amount of the application processor 110 exceeds about 10%, the electronic device 100 may be in a process of performing a task according to a user request. Accordingly, the communication processor 120 may determine that the electronic device 100 is not in the idle state.

According to another embodiment, the communication processor 120 may determine the idle state based on an on-call signal. For example, the communication processor 120 may detect a movement of the electronic device 100 by using a change in a signal received via at least one antenna, that is, a change in a peripheral electric field. As another example, although not illustrated, the electronic device 100 may include a sensor for detecting a movement of the electronic device 100. The sensor may include at least one of a motion sensor, a gyro sensor, and an approximation sensor. The communication processor 120 may detect the movement of the electronic device 100 based on sensor data obtained by using the sensor.

When the movement of the electronic device 100 is detected, the communication processor 120 may determine that the electronic device 100 is not in the idle state because the user may be operating the electronic device 100.

The communication processor 120 may execute a memory recovery task (S450). For example, when it is determined in operation S440 that the electronic device 100 is in the idle state, since the electronic device 100 is not manipulated by a user or performs a particular task, the present time may be determined as an optimal timing for the dynamic memory initialization. A detailed description of the memory recovery task is described below with reference to FIG.

Figure 5:
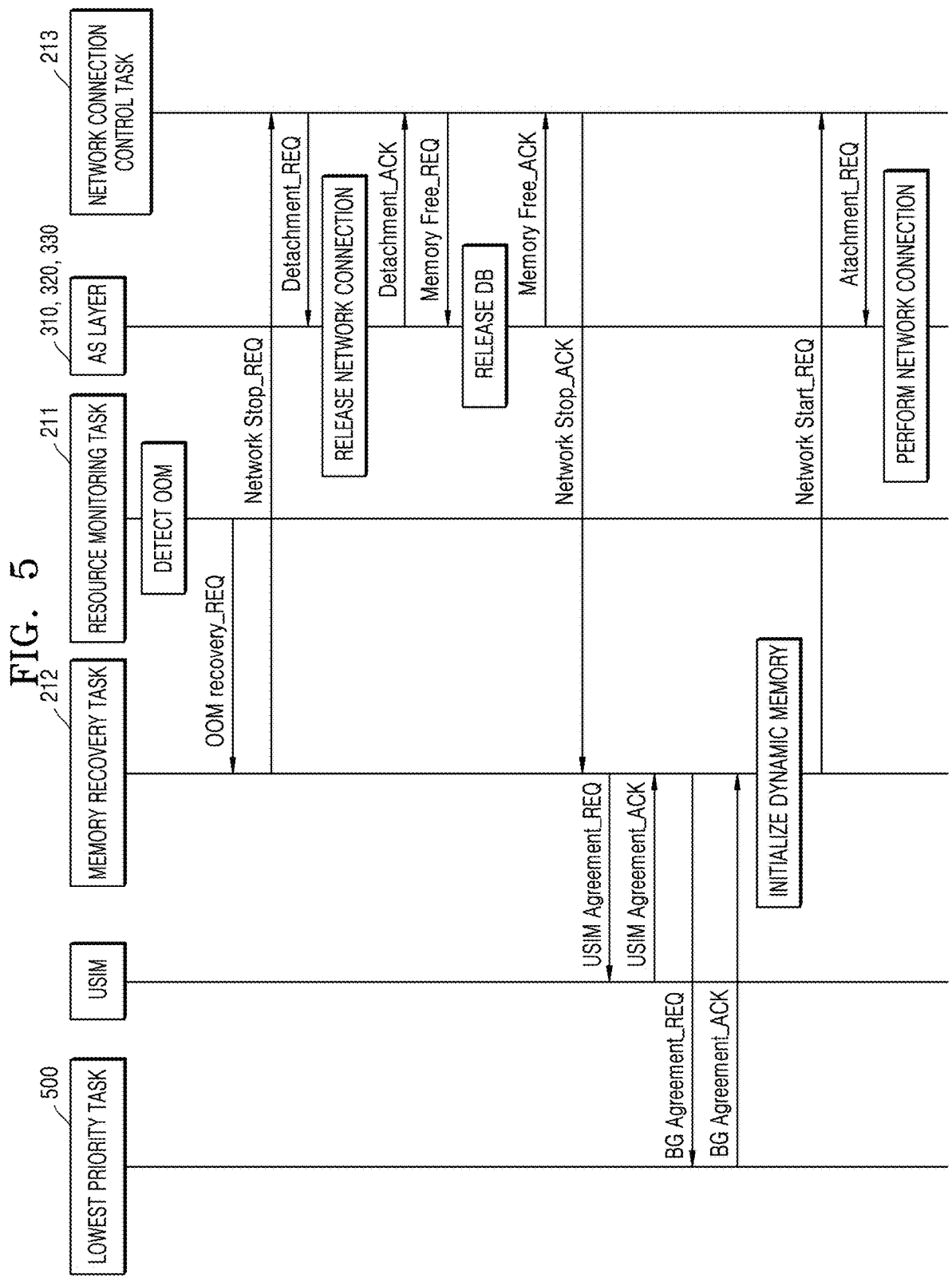
FIG. 5 is a signal exchange diagram of a communication processor, according to an example embodiment of the inventive concepts.

FIG. 5 is a signal exchange diagram of the communication processor 120, according to an example embodiment of the inventive concepts.

Referring to FIG. 5, the communication processor 120 may perform the resource monitoring task 211 and detect the OOM. For example, when the occupancy rate of the dynamic memory exceeds the first threshold value for the certain period and the electronic device 100 is not in the idle state, it may be determined that the communication processor 120 detects the OOM and performs memory recovery. Accordingly, the communication processor 120 may generate an OOM recovery request (recovery_REQ) signal for executing the memory recovery task 212.

In response to the OOM recovery_REQ signal, the memory recovery task 212 may generate a network stop_REQ signal for executing the network connection control task 213. The network stop_REQ signal may correspond to a signal for instructing a forcible release of the network connection.

In response to the network stop_REQ signal, the network connection control task 213 may generate a detachment_REQ signal requesting the AS layer to release the network connection. For example, the network layer 330 of the AS layer may release the network connection of the currently established radio bearers. After releasing the network connection, the AS layer may generate a detachment acknowledgement (detachment_ACK) signal for notifying a release of the network connection.

The network connection control task 213 may receive the detachment_ACK signal and determine that all network connections (e.g., radio bearers) previously connected are normally released. However, when the detachment_ACK signal is received, the network connection control task 213 may identify that the network connection is inactivated but in the idle state (e.g., an RRC_idle state). For example, configuration information related to the network connection may be stored in a database stored in the dynamic memory. Accordingly, by releasing all configuration information related to the network connection, the network connection control task 213 may generate a memory free request signal (e.g., memory free_REQ signal) for completely disconnecting the network connection.

The AS layer may release the database stored in the dynamic memory corresponding to each of the layers in response to the memory free_REQ signal. When the database is released, all configuration information related to the network connection may be deleted, and it may be understood that the network connection state is completely released. Thereafter, the AS layer may generate a memory free_ACK signal indicating that all normal databases stored in the dynamic memory have been released.

In response to the memory free_ACK signal, the network connection control task 213 may generate a network stop_REQ signal indicating that all network connections of the electronic device 100 have been released. The AS layer may receive or generate a network stop_ACK corresponding to the network stop_REQ signal after the network connection is deleted.

Based on the network stop_ACK signal corresponding to the network stop_REQ signal, the memory recovery task 212 may identify that all network connections of the electronic device 100 have been disconnected. According to various embodiments, various works may be performed in the background tasks at the time when the network stop_ACK signal has been received. As described above, the various tasks may be allocated with partial areas of the dynamic memory and may temporarily store data. Tasks, which are performed independently of the network connection, for example, modulation and demodulation at the physical layer 310, may still be running. When the dynamic memory is initialized even though the data of the tasks still being executed is stored in the dynamic memory, there is a possibility that one-time free, that is, a memory error of duplicate releasing of an area allocated by the malloc function, may occur, because a partial area has been allocated by the malloc function but the one-time free, or the dynamic memory initialization has not been recognized while the initialization of the dynamic memory is performed. Accordingly, to prevent the memory duplicate release, when there is no task waiting in a task queue, the memory recovery task 212 may start the initialization of the dynamic memory.

According to various embodiments, there are databases that lose information by forcibly initializing the dynamic memory while, without awareness of a user, a network is disconnected and re-connected. The databases may need to be maintained regardless of the dynamic memory initialization related to the network disconnection. This requirement may be distinguished from the rest of initialized and deleted databases by adding flag information. For example, databases to which the flag is added may be stored in the flag area 222-1 of the dynamic memory area 222, and the dynamic memory initialization may performed only on the non-flag area 222-2 of the dynamic memory area 222. For example, databases that need to be maintained regardless of the dynamic memory initialization may include subscriber information module (SIM) information, timer information, location information, etc. Accordingly, a universal (U) SIM (USIM), a global positioning system (GPS), and a timer may periodically store databases, to be maintained regardless of the dynamic memory initialization, in the flag area 222-1 of the dynamic memory area 222. Referring to FIG. 5, the memory recovery task 212 may generate and transmit a USIM agreement_REQ signal to the USIM. In response to storing the SIM information in the flag area 222-1, the USIM may generate and transmit a USIM agreement_ACK signal to the memory recovery task 212. The memory recovery task 212 may receive the USIM agreement_ACK signal, determine that the SIM information is not lost even though the memory initialization is performed because the SIM information is stored in the flag area, and may perform a next operation to determine whether there is currently a task being performed in the background task.

The above embodiment has been directed to a device including one SIM, but the inventive concepts are not limited thereto. For example, when the electronic device 100 is a multi SIM device including at least two SIMs, the memory recovery task 212 may generate USIM agreement_REQ signals corresponding to the at least two SIMs. Accordingly, when the dynamic memory initialization is performed even though the USIM agreement_ACK has not been received from all the SIMs, the memory recovery task 212 may delay the dynamic memory initialization because at least some SIM information may be lost. For example, the memory recovery task 212 may start a memory initialization after receiving the USIM agreement_ACK from all the SIMs or a predetermined minimum number of SIMs.

In addition, referring to FIG. 5, only the USIM agreement_REQ signal and the USIM agreement_ACK signal are illustrated, but the embodiment is not limited thereto. For example, although not illustrated, the memory recovery task 212 may transmit a Global Positioning System (GPS) agreement_REQ signal to the GPS and receive a GPS agreement_ACK signal. Since the GPS agreement_ACK signal indicates that the GPS has stored location information in the flag area 222-1, the memory initialization for the non-flag area 222-2 may start. As another example, the memory recovery task 212 may transmit a timer agreement_REQ signal to an internal timer and receive a timer agreement_ACK signal. Since the timer agreement_ACK signal indicates that the internal timer has stored location information in the flag area 222-1, the memory initialization for the non-flag area 222-2 may start. For example, the SIM information, the timer information, the position information, etc., which need to be maintained even after the memory initialization, may be stored in the flag area 222-1 of the dynamic memory area 222 in advance, and accordingly, the memory initialization may be prevented from being forcibly released and the database may be maintained.

The memory recovery task 212 may generate a background (BG) agreement_REQ signal to determine whether there is a task currently being performed. The BG agreement_REQ signal may correspond to a signal for requesting a task corresponding to a lowest priority. When a task queue includes tasks of higher priority than a lowest priority task 500, since a task scheduling is made according to a priority, the lowest priority task 500 may decode the BG agreement_REQ signal, and accordingly, may not generate the BG agreement_REQ signal. For example, since the task queue includes other tasks being performed and/or tasks having priorities higher than the present lowest priority task 500, which would generate the BG agreement_ACK signal, the BG agreement_ACK signal is not generated, and the memory recovery task 212 may recognize that not all tasks have been completed. Accordingly, to prevent the memory error of the duplicate release as described above, the dynamic memory initialization may be delayed. When the memory recovery task 212 receives the BG agreement_ACK signal, since there is no task of higher priority waiting in the task queue, it may be understood that the lowest priority task 500 is scheduled to receive the BG agreement_ACK signal. Accordingly, the memory recovery task 212 may identify that all tasks are currently completed and the task queue is empty and the memory recovery task 212 may start the dynamic memory initialization.

The memory recovery task 212 may clear the memory. For example, the memory recovery task 212 may maintain databases stored in the flag area 222-1 of the dynamic memory area 222 and free all databases stored in the non-flag area 222-2.

Since the memory recovery task 212 has added a flag to information that needs to be maintained regardless of the initialization, it may be understood that the database stored in the flag area 222-1 is independent of the memory recovery. In addition, it may be understood that normal databases that have no memory leakage (for example, network configuration information related to a radio bearer) are already released by the memory free_REQ signal. Accordingly, the memory of the non-flag area 222-2 of the dynamic memory area 222 at the time of performing the dynamic memory initialization may be related to memory leakage. Thus, the memory recovery task 212 may remove the memory having a possibility of the memory leakage by entirely freeing the memory of the non-flag area 222-2.

According to various embodiments, by activating an interrupt (INT) lock LOCK prior to performing the initialization, the memory recovery task 212 may not be affected by any interrupt that occurs during the initialization of the non-flag area 222-2. After the initialization of the non-flag area 222-2 is completed, the memory recovery task 212 may receive an interrupt by activating an INT UNLOCK again.

After the initialization of the non-flag area 222-2 is completed, the memory recovery task 212 may generate a network start_REQ signal to reconnect a network that has been forcibly released.

The network connection control task 213 may transmit an attachment_REQ signal to the physical layer 310, the data link layer 320, and the network layer 330 of the AS layer in response to the network start_REQ signal. For example, the network layer 330 may open the radio bearer for network connection in response to the attachment_REQ signal.

Figure 6B:
FIG. 6B illustrates a screen displayed on a display, according to an example embodiment of the inventive concepts.
Figure 6B:
Figure 6B:
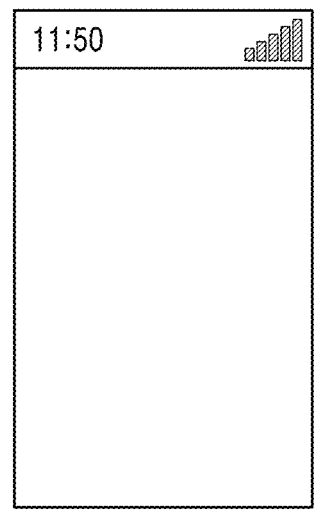

FIG. 6A is a signal exchange diagram between an application processor and a communication processor, according to an example embodiment of the inventive concepts. FIG. 6B illustrates a screen displayed on a display, according to an example embodiment of the inventive concepts. Duplicate descriptions given with respect to FIG. 5 are omitted.

Referring to FIG. 6A, the application processor 110 may transmit an AP_query to the interface 130. The interface 130 may include an inter-processor channel (IPC) 131 and a packet handler 132.

The IPC 131 may be referred to as an interface for communication between the communication processor 120 and the application processor 110. For example, the application processor 110 may transmit the AP query to the IPC 131 to obtain information such as reception sensitivity and communication status. The IPC 131 may transmit a response indicating the current communication status in response to the AP query. The response may be referred to as an AP_response OK signal.

The packet handler 132 may be a physical path for delivering the AP query or a response signal to the AP query between the IPC 131 and the application processor 110.

According to various embodiments, the application processor 110 may periodically transmit the AP query. For example, in a first section ①, the application processor 110 may periodically transmit the AP query to the IPC 131, and since the network communication in the first section ① is normal, the IPC 131 may respond to the AP query with the AP_response OK signal. Referring to FIG. 6B, it may be identified that all the antenna-shaped bars indicating a reception strength are displayed in black color in an indicator area of the top end of the display corresponding to the first section ①.

However, when a memory leakage occurs in the communication processor 120 and the OOM is detected during the first section ①, the memory recovery task 212 in FIG. 5 may be executed to generate a network stop_REQ signal. The network connection control task 213 may transmit the detachment_REQ signal to the AS layer in response to the network stop_REQ signal, and at the same time, the network connection control task 213 may transmit the network stop_REQ signal to the IPC 131. For example, if the IPC 131 receives the network stop_REQ signal from the communication processor 120, the IPC 131 may determine that the network connection is going to be temporarily released due to the OOM that occurred in the communication processor 120. In this case, when the IPC 131 transmits a signal indicating a release of the network connection in response to the AP query, the user may recognize the release of the network connection. Accordingly, in response to the AP query from a time point at which the network stop_REQ signal is received to a time point at which the network start_REQ signal is received, the IPC 131 may be preconfigured to transmit the AP_response out of service (OOS) signal to the application processor 110. For example, a time duration from the time point at which the network stop_REQ signal is received to the time point at which a network start_REQ is received may correspond to a second section ②.

According to various embodiments, the packet handler 132 may receive a signal indicating a task suspension or a task resume in the second section ②. The packet handler 132 may receive a task suspension signal from the memory recovery task 212. In response to a task suspension signal, the packet handler 132 may hold a packet associated with the AP query which is delivered from the application processor 110 to the IPC 131. For example, the packet handler 132 may not deliver the AP query signal to the IPC 131 such that no interrupt is generated to the communication processor 120. For example, the packet handler 132 may not transmit AP query signals but accumulate AP query signals, received from a time point at which the task suspension signal is received to a time point at which a task resume signal is received. According to various embodiments, the accumulated AP queries may be added with a flag and stored in the flag area 222-1 of the dynamic memory area 222 such that data loss due to the dynamic memory initialization is prevented.

Referring to FIG. 6B, it may be identified that all the antenna-shaped bars indicating a reception strength are displayed in white color in an indicator area of the top end of the display corresponding to the second section ②. For example, the user may simply recognize that the current channel state or the connection state is deteriorated by using the antenna-shaped bars, but may not recognize that the network connection is reconnected after being completely disconnected.

In the third section ③, the IPC 131 may receive the AP queries stored by the packet handler 132 and transmit the AP_response OK signal because the connection state is good after the network is reconnected. Referring to FIG. 6B, it may be identified that all the antenna-shaped bars indicating a reception strength are displayed in black color in an indicator area of the top end of the display corresponding to the third section ③.

According to the above-described embodiments, when the OOM occurs, the communication processor 120 may perform the dynamic memory initialization. The communication processor 120 may release the memory area used by the database for the network connection by disconnecting the network, and may initialize the dynamic memory by receiving the BG_agreement_ACK signal from the lowest priority task 500, the receiving of the ACK signal indicating that the task queue is empty. For example, instead of performing a continuous monitoring for releasing the memory leakage, by performing a network release similar to a case of performing a flight mode without the recognition of the user, the communication processor 120 may effectively prevent a system halt due to memory leakage and a memory error.

While the inventive concepts has been particularly shown and described with reference to embodiments thereof, it will be understood that various changes in form and details may be made therein without departing from the spirit and scope of the following claims.

What is claimed is:

1. An electronic device comprising:
   an application processor; and
   a communication processor comprising a resource memory, the communication processor configured to
   monitor an occupancy rate of the resource memory,
   determine whether the electronic device is in an idle state,
   release a network connection based on a determination that the electronic device is in the idle state,
   clear the resource memory while the network connection is released,
   schedule a task having a lowest priority after the network connection is released,
   perform an initialization of the resource memory in response to receiving an acknowledge (ACK) signal, the ACK signal indicating that all other tasks have been completed, and
   reconnect the network connection,
   wherein the idle state indicates a state wherein the electronic device is not occupied or used by a user.

2. The electronic device of claim 1, wherein the communication processor is further configured to determine whether the occupancy rate of the resource memory exceeds a first threshold value during a certain time period.

3. The electronic device of claim 2, wherein the communication processor is configured further to determine whether the electronic device is in communication with an external device based on an on-call signal.

4. The electronic device of claim 3, wherein the communication processor is further configured to determine whether a usage rate of the application processor exceeds a second threshold value when the communication processor is not in communication with the external device.

5. The electronic device of claim 4, further comprising:
   a sensor configured to measure a movement of the electronic device,
   wherein the communication processor is further configured to determine the movement of the electronic device based on a change of peripheral electric field information of the electronic device or movement information of the electronic device measured by the sensor.

6. The electronic device of claim 5, wherein the communication processor is configured to determine that the electronic device is in the idle state, when the communication processor is not in communication with the external device, the occupancy rate of the application processor does not exceed the second threshold value, and the movement of the electronic device is not detected.

7. The electronic device of claim 1, wherein the communication processor is configured to transmit an out of service (00S) signal in response to an application processor query signal received from the application processor after the network connection is released.

8. The electronic device of claim 1, wherein the resource memory comprises
   a flag area configured to store data to be maintained even when the network connection is released; and
   a non-flag area configured to store data that is dynamically allocated,
   wherein the communication processor is configured to initialize the resource memory by initializing the non-flag area.

9. An operating method of an electronic device, the method comprising:
   monitoring an occupancy rate of a resource memory in a communication processor;
   determining whether the electronic device is in an idle state;
   releasing a network connection based on a determination that the electronic device is in the idle state;
   clearing the resource memory while the network connection is released;
   scheduling a task having a lowest priority after the network connection is released;
   performing an initialization of the resource memory in response to receiving an acknowledge (ACK) signal, the ACK signal indicating that all other tasks have been completed; and
   reconnecting the network connection, wherein the idle state indicates a state wherein the electronic device is not occupied or used by a user.

10. The method of claim 9, wherein the monitoring of the occupancy rate of the resource memory further comprises determining whether the occupancy rate of the resource memory exceeds a first threshold value during a certain time period.

11. The method of claim 10, wherein the determining of whether the electronic device is in the idle state further comprises determining whether the electronic device communicates with an external device based on an on-call signal.

12. The method of claim 11, wherein the determining of whether the electronic device is in the idle state further comprises determining whether an occupancy rate of an application processor exceeds a second threshold value when the communication processor is not in communication with the external device.

13. The method of claim 12, wherein the determining of whether the electronic device is in the idle state further comprises determining movement of the electronic device based on a change of peripheral electric field information of the electronic device or sensor information indicating movement of the electronic device.

14. The method of claim 13, wherein the determining of whether the electronic device is in the idle state further comprises determining that the electronic device is in the idle state when the communication with the external device is not performed, the occupancy rate of the application processor does not exceed the second threshold value, and the movement of the electronic device is not detected.

15. The method of claim 9, further comprising transmitting an out of service (OOS) signal in response to an application processor query signal received from an application processor after the network connection is released.

16. The method of claim 9, wherein
the resource memory comprises a flag area configured to store data to be maintained even when the network connection is released, and a non-flag area configured to store data that is dynamically allocated,
wherein the initializing the resource memory comprises initializing the non-flag area.

17. The method of claim 16, wherein data to be stored in the flag area comprises at least one of subscriber identification module (SIM) information, timer information, and location information.

18. An operating method of a communication processor, the method comprising:
monitoring an occupancy rate of a resource memory of the communication processor;
detecting whether the occupancy rate of the resource memory exceeds a threshold value during a threshold time period;
determining whether an electronic device comprising the communication processor is in an idle state in response to detecting that the occupancy rate of the resource memory exceeds the threshold value;
releasing a wireless network connection in an identical manner to a flight mode when the electronic device is in the idle state, the releasing the wireless network connection including releasing configuration information related to the wireless network connection;
clearing a dynamic memory area of the resource memory while the wireless network connection is released; and
performing an initialization of the resource memory in response to receiving an acknowledge (ACK) signal, the ACK signal indicating that all other tasks have been completed,
wherein the idle state indicates a state wherein the electronic device is not occupied or used by a user.

* * * * *